(12) United States Patent
Webster et al.

(10) Patent No.: US 7,489,747 B2
(45) Date of Patent: Feb. 10, 2009

(54) DECISION DIRECTED FLICKER NOISE CANCELLATION

(75) Inventors: Mark A. Webster, Indian Harbour Beach, FL (US); Alex C. Yeh, West Melbourne, FL (US); Keith R. Baldwin, Melbourne Beach, FL (US)

(73) Assignee: Xocyst Transfer AG L.L.C., Wilmington, DE (US)

( * ) Notice: Subject to any disclaimer, the term of this patent is extended or adjusted under 35 U.S.C. 154(b) by 742 days.

(21) Appl. No.: 10/778,854

(22) Filed: Feb. 13, 2004

(65) Prior Publication Data

US 2004/0165687 A1   Aug. 26, 2004

Related U.S. Application Data (60) Provisional application No. 60/449,040, filed on Feb. 21, 2003, provisional application No. 60/463,938, filed on Apr. 18, 2003.

(51) Int. Cl.
*H03D 1/04* (2006.01)
(52) U.S. Cl. .................. 375/346; 375/350; 375/348; 375/284; 375/285; 375/254; 375/144
(58) Field of Classification Search .......... 375/346, 375/285, 345, 222, 348, 350, 284, 254, 144; 327/307; 455/284, 296; 370/206
See application file for complete search history.

(56) References Cited

U.S. PATENT DOCUMENTS

| | | | | |
|---|---|---|---|---|
| 4,709,237 | A * | 11/1987 | Poullain et al. ............. | 342/203 |
| 6,275,087 | B1 * | 8/2001 | Dehghan .................... | 327/306 |
| 6,889,037 | B2 * | 5/2005 | Darabl ....................... | 455/323 |
| 6,901,121 | B1 * | 5/2005 | Dubrovin et al. ............ | 375/346 |
| 7,050,389 | B2 * | 5/2006 | Muraoka .................... | 370/206 |
| 7,072,427 | B2 * | 7/2006 | Rawlins et al. .............. | 375/346 |
| 2002/0196863 | A1 * | 12/2002 | Kaku et al. .................. | 375/285 |

\* cited by examiner

*Primary Examiner*—Shuwang Liu
*Assistant Examiner*—Kabir A Timory
(74) *Attorney, Agent, or Firm*—McDonnell Boehnen Hulbert & Berghoff LLP (57) ABSTRACT

A decision directed flicker noise canceller for reducing flicker noise in a modulated input signal according to an embodiment of the present invention includes a decision circuit, a conversion circuit, first and second adders and a filter. The decision circuit provides signal decisions based on the input signal. The conversion circuit provides selected signal values based on the signal decisions. The first adder subtracts the selected signal values from signals based on the input signal to provide a flicker noise estimate. The filter receives and filters the flicker noise estimate and the second adder subtracts the filtered flicker noise estimate from the input signal and provides a corrected input signal. In a feedback configuration, the second adder is located in a feedback position before the decision circuit in the signal processing path. In a feed-forward configuration, the second adder is located in a feed-forward position after the decision circuit.

23 Claims, 7 Drawing Sheets

DECISION DIRECTED FLICKER NOISE CANCELLATION

CROSS-REFERENCE TO RELATED APPLICATIONS

This application claims the benefit of U.S. Provisional Application Nos. 60/449,040, filed on Feb. 21, 2003, and 60/463,938, filed on Apr. 18, 2003, which are both herein incorporated by reference for all intents and purposes.

BACKGROUND OF THE INVENTION

1. Field of the Invention

The present invention relates to communication systems, and more particularly to a decision directed flicker noise cancellation apparatus and method for reducing flicker noise in communication devices including wireless communication devices configured in a zero intermediate frequency (ZIF) architecture.

2. Description of the Related Art

Figure 1:
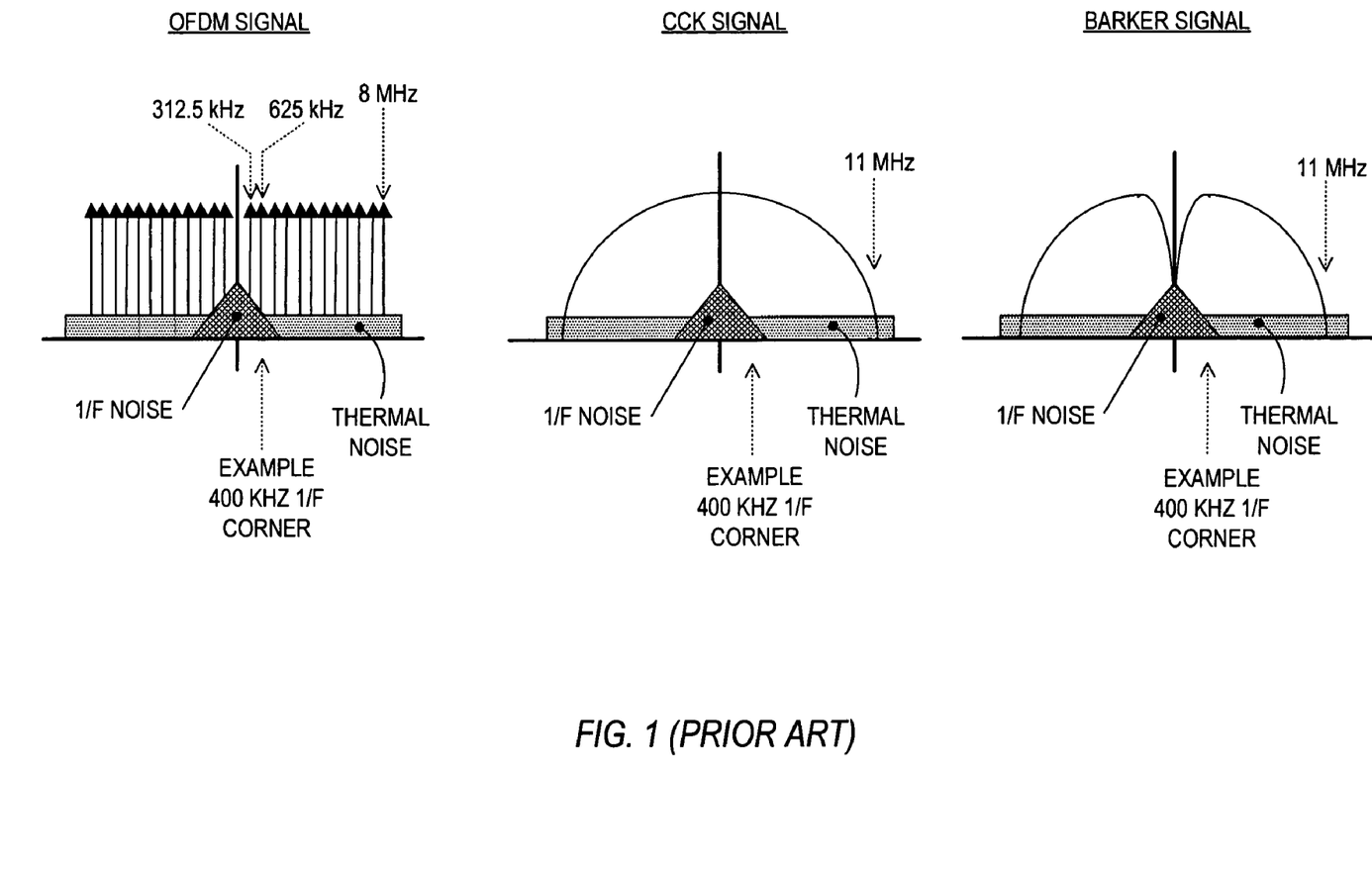
FIG. 1 shows plots of flicker noise for OFDM, CCK and Barker signals.

FIG. 1 shows plots of flicker noise for Orthogonal Frequency Division Multiplexing (OFDM) signals, Complementary Code Keying (CCK) signals, and Barker signals, respectively. As shown, flicker noise is spectrally coincident with OFDM, CCK and Barker signals. For OFDM, the four lower frequency tones on either side of DC are affected. CCK is most sensitive whereas Barker is a little less sensitive as having less signal energy at zero frequency.

The present disclosure concerns a novel system and method for reducing flicker noise (1/f), including wireless devices using any combination of Barker, CCK and OFDM type signals. Flicker noise is associated with the level of DC in a signal and has a 1/f spectral power density in which the noise is greatest near DC and rolls off with increasing frequency. In communication systems, flicker noise causes harmful effects in the receiver, and is generated within analog processing circuitry for converting a received signal to baseband (BB). Although flicker noise may be present in strong signals with a relatively high signal to noise ratio (SNR), flicker noise is particularly problematic for weaker signals in which it becomes more difficult to distinguish between signal and noise. In wireless communications, for example, flicker noise depreciates the quality of signal decisions resulting in relatively noisy constellation plots, which increases the packet error rate (PER) and reduces communication efficiency and performance.

Prior techniques sought to avoid the 1/f peak at zero frequency at a cost of increased frequency and sampling rate. Such techniques invariably resulted in increased power levels and higher cost. It is desirable, however, to reduce power consumption and cost while simultaneously increasing performance and communication efficiency. It is desired, for example, to reduce or eliminate the effects of flicker noise without modifying frequency or sampling rate.

The present invention is illustrated for use in the wireless local area network (WLAN) environment, particularly direct conversion or zero intermediate frequency (ZIF) configurations in which there is significant gain at low frequencies and DC. The present invention is equally applicable, however, in any type of system in which flicker noise is generated. In a ZIF WLAN configuration, flicker noise is typically generated in radio frequency (RF) analog circuitry and degrades digital signal processing in the digitized baseband. Furthermore, although flicker noise exists in bipolar devices, it is substantially greater in CMOS (Complementary Metal Oxide Semiconductor) devices when CMOS technology is employed for implementation. It is desired to combine analog and digital circuitry onto a single chip or integrated circuit (IC) employing CMOS technology. Therefore, it is desired to reduce or otherwise eliminate flicker noise to enhance the quality of signal decisions and improve communication efficiency.

Non-coherent flicker noise cancellation techniques have trouble distinguishing modulation noise from flicker noise. Non-coherent flicker noise mitigation techniques, such as the high pass filter (HPF), affect both the signal and the noise. Hence, the flicker noise estimate is corrupted. Furthermore, the HPF distorts (e.g., notches) the signal, degrading PER performance. It is desired to provide relatively simple, decision-directed joint DC and flicker noise cancellation.

SUMMARY OF THE INVENTION

A decision directed flicker noise canceller for reducing flicker noise in a modulated input signal according to an embodiment of the present invention includes a decision circuit, a conversion circuit, first and second adders and a filter. The decision circuit provides signal decisions based on the noise-corrupted input signal. The conversion circuit provides noise-free signal values based on the signal decisions. The first adder subtracts the noise-free signal values from signals based on the input signal to provide a flicker noise estimate. The filter receives and filters the flicker noise estimate and the second adder subtracts the filtered flicker noise estimate from the input signal and provides a corrected input signal.

In a feedback configuration, the second adder is located in a feedback position before the decision circuit in the signal processing path. In this case, the decision circuit includes a demodulator that converts the corrected input signal from the second adder into the signal decisions. The conversion circuit is a memory that stores predetermined values that are selected based on the signal decisions. A buffer is included that stores corrected signal samples from the corrected input signal. The first adder subtracts selected values from the memory from corresponding corrected signal samples from the buffer.

In various feedback embodiments, the demodulator includes a correlator and a decision circuit and the memory is a codeword or symbol look-up memory. The demodulator and conversion circuit may include multiple decision paths, each including a correlator, a decision circuit and a look-up memory. In this case, a switch is included to select from among the decision paths based on the type of input signal. The filter may include a multiplier that scales the flicker noise estimate and an accumulator that accumulates flicker noise estimate samples.

In a feed-forward configuration, the second adder is located in a feed-forward position after the decision circuit. In this case, the decision circuit may be a demodulator that demodulates the input signal to provide the signal decisions and the conversion circuit is a modulator that re-modulates the signal decisions to generate the noise-free selected signal values. A first delay device is included to delay the input signal to align timing with the noise-free selected signal values at the first adder. A second delay device is included to delay the input signal to align timing with the filtered flicker noise estimate at the second adder. In a more refined embodiment, a decoder and an encoder are provided in the flicker noise estimate path. The decoder decodes the demodulated signal from the demodulator to provide the signal decisions. The encoder encodes the signal decisions to provide encoded signals to the modulator.

A decision directed method of canceling flicker noise in a modulated input signal includes making signal decisions based on the input signal, converting the signal decisions into noise-free selected signal values, subtracting the selected signal values from a signal based in the input signal to provide a flicker noise estimate, filtering the flicker noise estimate, and subtracting the filtered flicker noise estimate from the input signal to provide a corrected input signal.

In one aspect, the method may include buffering corrected input signal samples from the corrected input signal. Making signal decisions may include demodulating the corrected input signal and converting may include retrieving pre-stored values selected based on the demodulating. In this case, the method includes subtracting retrieved values from corresponding ones of the buffered corrected input signal samples.

In another aspect, making signal decisions may include demodulating the input signal and generating signal decisions. The converting may include re-modulating the signal decisions and generating noise-free selected signal values. In this case, the method includes delaying the input signal to provide first delayed input signals that are time-aligned with the selected signal values and subtracting the selected signal values from the first delayed input signals. Also, the method may include delaying the input signal to provide second delayed input signals that are time-aligned with the filtered flicker noise estimate, and subtracting the filtered flicker noise estimate from the second delayed input signals.

BRIEF DESCRIPTION OF THE DRAWING(S)

The benefits, features, and advantages of the present invention will become better understood with regard to the following description and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In a first embodiment, signal decisions are made with demodulation and using a feed-forward configuration. These decisions may optionally be corrected using error correction code gain. The demodulated data is re-modulated and used as a reference to obtain a flicker noise estimate. In one embodiment, the re-modulated signal is time-aligned and subtracted from the composite input signal and filtered to match the flicker noise spectral corner. The flicker noise estimate is then time-aligned and subtracted from the composite input signal resulting in a flicker noise excised signal that is demodulated using another conventional demodulator, or reusing a single demodulator. The cancellation structure exploits processing gain in coded demodulation decisions and in matching the flicker noise spectral signature. The demodulation and "re-modulation" operations may be implemented by reusing existing signal processing blocks with a minimal amount of additional control.

In alternative embodiments, the cancellation structure is configured in a feedback configuration which estimates and then cancels the flicker noise introduced in communication circuitry. In this case, the cancellation structure subtracts DC and flicker before making signal decisions. In 802.11 embodiments, the Barker preamble of a packet is used to acquire and begin tracking the flicker noise to derive an initial flicker noise estimate, which is subtracted from the first codeword and/or symbol received. Thereafter, each current codeword decision is used to update the flicker noise estimate, which is subtracted from the next received codeword and/or symbol for the remaining codewords/symbols of the packet.

Figure 2:
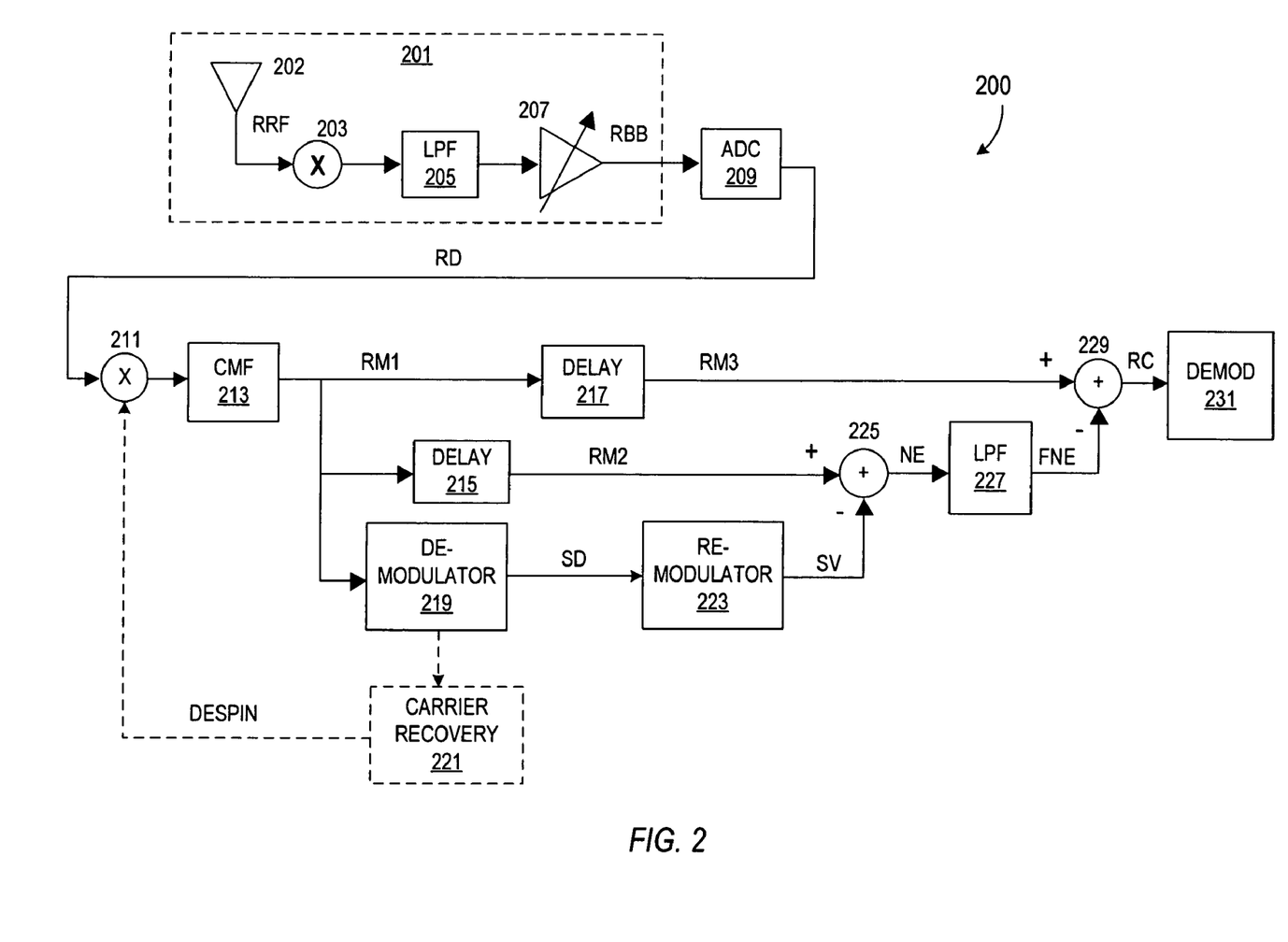
FIG. 2 is a simplified block diagram of a wireless receiver including feed-forward decision directed flicker noise cancellation according to an exemplary embodiment of the present invention.

FIG. 2 is a simplified block diagram of a wireless receiver 200 including feed-forward decision directed flicker noise cancellation according to an exemplary embodiment of the present invention. Many details are omitted that are not necessary for a complete understanding of the present invention. The illustrated receiver 200 includes a ZIF front end 201 in which a received RF signal RRF is directly converted from RF to a baseband signal RBB. The wireless receiver 200 is employed for WLAN applications implemented according to any one or more of the 802.11 standards, such as, for example, 802.11a, 802.11b and 802.11g. It is appreciated, however, that the present invention is applicable to any wired or wireless communication devices in which it is desired to reduce or otherwise eliminate flicker noise. The ZIF front end 201 includes an antenna 202 for detecting the RRF signal in a wireless medium, a mixer 203 for converting the RRF signal to baseband, a low-pass filter (LPF) 205 for filtering the baseband signal, and a baseband automatic gain control (AGC) amplifier 207 for controlling the gain of the received signal prior to digital conversion and baseband processing.

The analog RBB signal from the BB AGC 207 is converted to a digital received baseband signal RD by an analog to digital converter (ADC) 209, and the RD signal is provided to one input of a mixer 211. The mixer 211 has another input receiving a DESPIN signal, and has an output coupled to an input of a channel matched filter (CMF) 213. The CMF 213 outputs a modulated received signal RM1. The particular modulation and/or encoding employed depends upon the signal type transmitted by the transmitter (not shown). For WLAN applications, 1 and 2 megabits per second (Mbps) rates are encoded according to Barker word encoding spreading, 5.5 and 11 Mbps bit rates are encoded according to CCK encoding, and 6-54 Mbps rates employ OFDM. It is appreciated that future waveforms and wideband waveforms from other standards are contemplated, such as, for example, Ultra-WideBand (UWB) or the like.

The RM1 signal is provided to inputs of a first delay device 215, a second delay device 217 and a demodulator 219. The demodulator 219 demodulates the RM1 signal according to the signal type, such as according to Barker, CCK, OFDM, QAM, etc. It is appreciated that the demodulator 219 may incorporate multiple demodulators, one for each expected input signal type. A carrier recovery module 221 is shown in dashed lines coupled to the demodulator 219 for detecting and recovering the carrier and for generating the DESPIN signal to the mixer 211. The carrier recovery module 221 is provided in an optional embodiment for de-spinning the digital RD signal as known to those skilled in the art. It is appreciated that other despin techniques (not shown) may be employed if desired. In one embodiment for OFDM signals incorporating 48 sub-carrier signals, only the lower 4 tones associated with the lower frequencies are demodulated by the demodulator 219. The demodulator 219 outputs hard decisions or signal decisions (SD) estimating the original chips and/or symbols within the original transmitted signal. The SD signal is provided to an input of a modulator or "re-modulator" 223, which re-modulates the SD signal according to the signal type. Again, any one or more conventional signal modulators may be included in the re-modulator 223 depending upon expected signal type, such as according to Barker, CCK, OFDM, QAM, etc. The output of the re-modulator 223 provides a signal estimate or noise-free selected signal value (SV) that is an noise-free estimate of the originally transmitted signal.

The first delay device 215 outputs a delayed version of the RM1 signal, shown as the RM2 signal, where the delay is sufficient to align timing of the RM2 and SV signals provided to respective inputs of an adder 225. The adder 225 subtracts the SV signal from the RM2 signal to provide an unfiltered noise estimate (NE) signal at its output. The NE signal is provided to an LPF 227, which outputs a filtered flicker noise estimate (FNE) signal to the inverting input of another adder 229. The adder 229 has a non-inverting input for receiving a delayed received signal RM3 from the output of the second delay device 217. The delay of the second delay device 217 is sufficient to align timing of the RM3 and FNE signals, such as equal to the delay through the first delay device 215 plus delay through the adder 225 and the LPF 227. The adder 229 subtracts the FNE signal from the RM3 signal to provide a corrected received signal RC in which flicker noise has been removed or otherwise excised. The RC signal is then provided to downstream demodulation circuitry 231.

The demodulation process performed by the demodulator 219 estimates the transmitted signal information, where the estimated information incorporated in the SD signal is then modulated to provide the signal estimate or selected value signal SV without the flicker noise. The SV signal is subtracted from the RM2 signal (delayed version of RM1 or input signal) by the adder 225 to remove the signal estimate values from the received or input signal containing the signal and flicker noise, thereby providing the NE signal representing an unfiltered flicker noise estimate. The LPF 227 removes higher frequency energy and outputs an estimate of the flicker noise as the FNE signal, which is subtracted from the RM3 signal (another delayed version of RM1 or the input signal). In this manner, the flicker noise in the RM1 signal is canceled resulting in the RC signal with reduced flicker noise.

For embodiments in which any one of multiple signal types are expected, such as a multi-band or multi-mode radio (e.g., any combination of 802.11a, b and g), the demodulation and re-modulation process employed to determine the flicker noise estimate (e.g., the FNE signal) is temporarily suspended until the modulation type is known, such as determined by downstream processing circuitry or the like. Once the signal type is determined, the demodulation and re-modulation is activated to determine and remove the flicker noise estimate. In one embodiment of the invention, the last valid flicker noise estimate at the cancellation adder 229 may be held constant or allowed to slowly decay for a period of time after the cancellor is deactivated.

Figure 3:
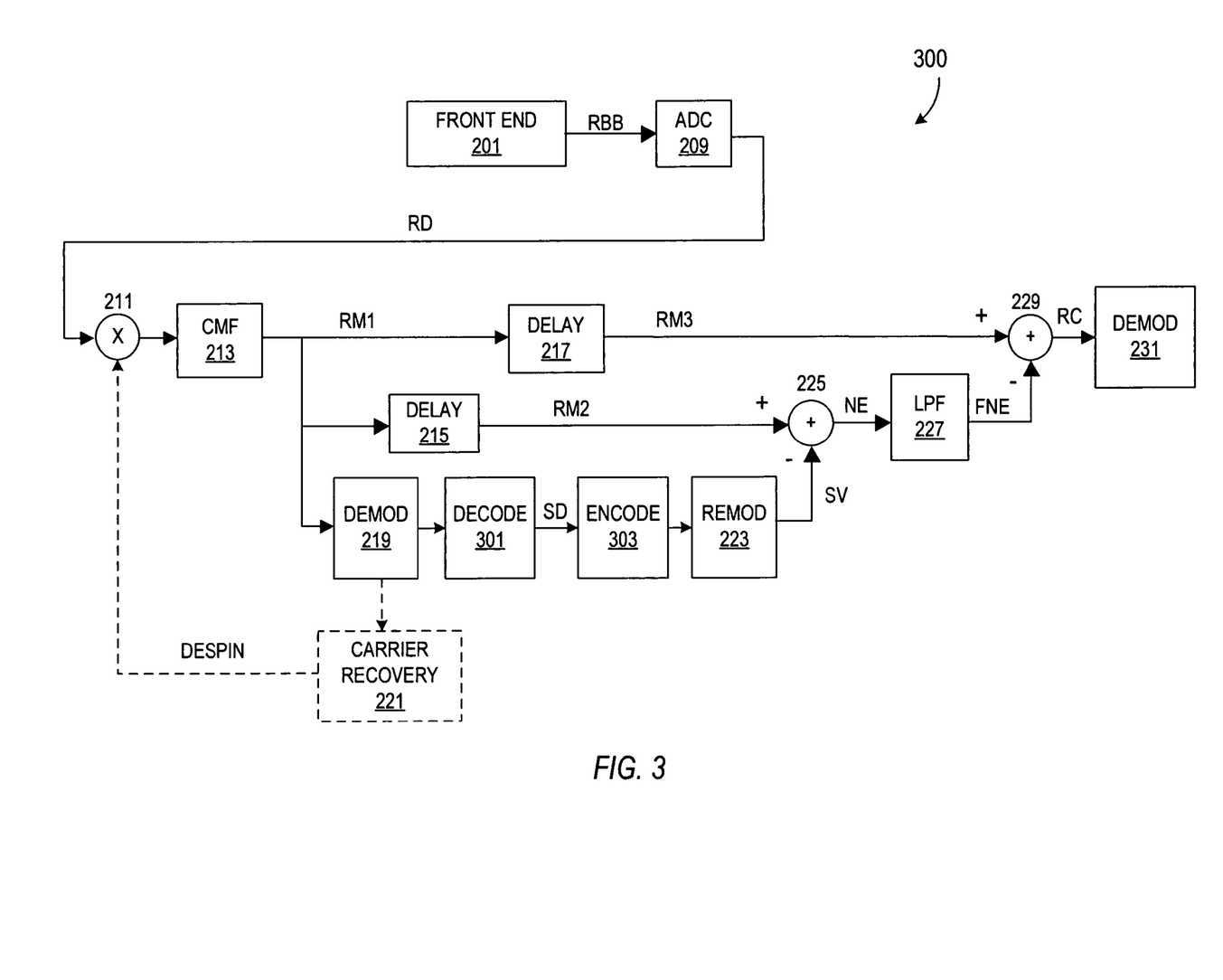
FIG. 3 is a simplified block diagram of a wireless receiver including feed-forward decision directed flicker noise cancellation according to another exemplary embodiment of the present invention.

FIG. 3 is a simplified block diagram of a wireless receiver 300 including feed-forward decision directed flicker noise cancellation according to another exemplary embodiment of the present invention. The wireless receiver 300 is similar to the wireless receiver 200 in which similar components assume identical reference numbers. In this embodiment, the demodulation, re-modulation process is refined to include a decoder 301 and an encoder 303. In particular, the decoder 301 is coupled at the output of the demodulator 219 to further refine the SD signal, which is then encoded by the encoder 303 and modulated by the re-modulator 223 to provide the SV signal. Operation is substantially similar, except that the signal decisions and signal value estimates are more accurate and refined using error correction code gain. Such error correction code gain is more pronounced with CCK and Barker waveforms. For OFDM, such error correction code gain is not as high, and may require decoding and re-encoding each of the sub-carrier signals even though signal degradation due to flicker 1/f noise is at the lower frequency tones about DC.

Simulated results using the directed flicker noise cancellation techniques using preliminary signal estimation have verified a flicker noise performance degradation of 3-4 decibels (dB) was narrowed by up to 2 dB for at least a 2 dB improvement. The configurations of the receivers 200 and 300 are referred to as "feed-forward" in that the input signal traverses multiple processing paths that are combined at one or more points (e.g., adders 225/229) to achieve the desired results. There are several possible disadvantages of the feed-forward configurations. One is that there is no flicker noise mitigation for the first portion of the input signal so that the flicker noise estimate may be corrupted by decisions errors, especially for CCK decisions. Another possible disadvantage is transport lag in that extra demodulation and modulation stages add significant bulk delay to packet detection. An extra demod-remod equalizer is employed to execute each codeword. Also, the added circuitry, including the delay devices 215 and 217 are potentially expensive depending upon implementation, such as using first-in, first out (FIFO) buffers or the like.

Figure 4:
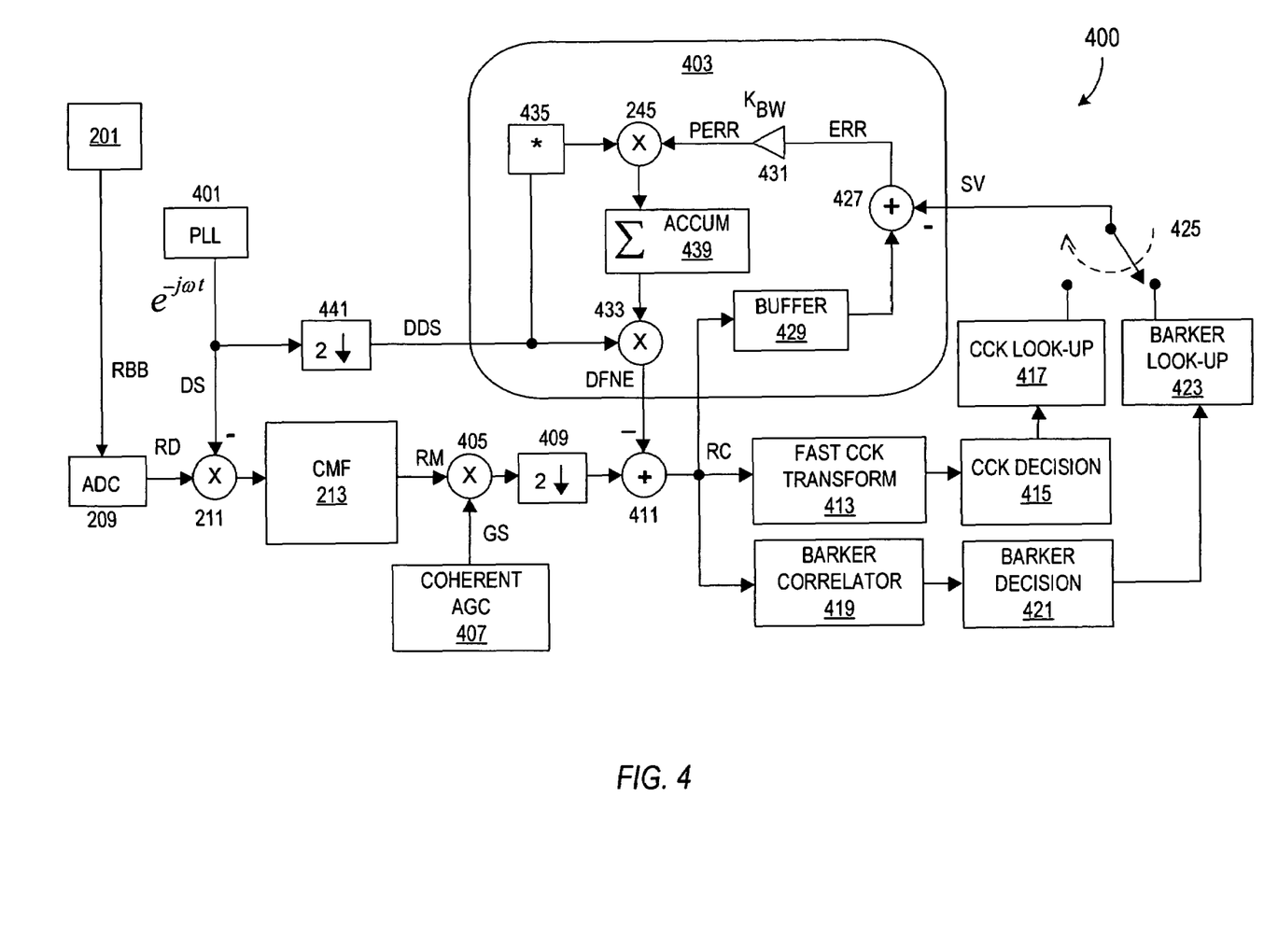
FIG. 4 is a simplified block diagram of a wireless receiver including feedback decision directed flicker noise cancellation according to an exemplary embodiment of the present invention.

FIG. 4 is a simplified block diagram of a wireless receiver 400 employing feedback decision directed flicker noise cancellation according to an exemplary embodiment of the present invention. The ZIF front end 201, the ADC 209 and the mixer 211 are included and operate in a similar manner as previously described in which the RD received baseband signal is provided to the non-inverting input of the mixer 211. The mixer 211 receives a de-spin (DS) signal (shown as $e^{-j\omega t}$) from a phase-locked loop (PLL) 401 at its inverting input, and has an output coupled to an input of the CMF 213. The PLL 401 detects a frequency offset inserted into the RD signal and generates the DS signal to de-spin the RD signal to remove the frequency offset. Removing the frequency offset from the RD signal, however, actually shifts flicker noise generated in the ZIF front end 201 from DC to a frequency offset. The CMF 213 outputs a modulated received signal RM, which is provided to an input of another combiner 405. The combiner 405 has another input that receives a gain signal (GS) from a coherent Automatic Gain Control (AGC) circuit 407 to adjust gain. The output of the combiner 405 is decimated by two by a decimator 409, which reduces the number of samples by half. In one embodiment for 802.11b configurations, the ADC 209 samples the RBB signal at a rate of 22 megahertz (MHz) so that the decimator 409 outputs a signal at a rate of 11 MHz. The output of the decimator 409 is provided to one input of an adder 411, which receives a DC and flicker noise estimate (DFNE) signal at its other input from a flicker noise feedback circuit 403, described further below. The adder 411 subtracts the DFNE signal from the output of the decimator 409 and generates a corrected received signal RC.

The RC signal is provided to a CCK correlator 413 and a Barker correlator 419 in two separate decision signal paths. In the CCK signal path, the CCK correlator 413 performs a fast CCK transform on the RC signal and has an output provided to an input of a CCK decision block 415, which outputs CCK decision signals to a CCK lookup memory 417 storing CCK codewords. The CCK lookup memory 417 outputs CCK codewords based on the CCK decision signals. In the Barker path, the Barker correlator 419 performs Barker correlation on the RC signal and has an output provided to an input of a Barker decision block 421, which output Barker decision signals to a Barker lookup memory 423 storing Barker codewords. The Barker lookup memory 423 outputs Barker codewords based on the Barker decision signals. As known to those of ordinary skill in the art, each 802.11b frame transmitted in a wireless medium includes a Barker preamble and a CCK payload. A switch 425 selects the Barker codewords output from the Barker lookup memory 423 during the Barker preamble and switches to select the CCK codewords output from the CCK lookup memory 417 during the CCK payload.

The selected codewords, symbols or values (SV) output from the switch 425 are provided to an adder 427 within the flicker noise feedback circuit 403, which is configured as a first-order tracking loop. The RC signals are also provided to an input of a buffer 429 within the flicker noise feedback circuit 403, which provides its output to another input of the adder 427. The buffer 429 effectively delays each RC signal sample output from the adder 411 so that it is time-aligned with the corresponding selected codeword or value from the switch 425 corresponding to that sample. The adder 427 subtracts the noise-free selected value from the switch 425 from its corresponding RC signal sample stored in the buffer 429 and provides an error (ERR) signal, which includes thermal noise and residual DC and flicker noise. The ERR signal is provided to the input of an amplifier 431, which scales or multiplies the ERR signal by a predetermined constant multiplier $K_{BW}$ for feedback control and provides a partial error signal (PERR) at its output. Meanwhile, the DS signal is provided to another decimator 441, which outputs a decimated de-spin signal DDS to one input of a combiner 433 within the flicker noise feedback circuit 403 and to an input of a complex conjugate block 435. The complex conjugate block 435 outputs a complex conjugate of the DDS signal, which is provided to an input of another combiner 437. The combiner 437 multiplies the PERR signal, received at its other input, with the complex conjugate of the DDS signal and generates a "de-spun" version of the PERR signal, which is provided to an input of an accumulator 439. The accumulator 439 effectively integrates samples of the error signal over time and outputs a de-spun version of the DC and flicker error estimate signal DFNE, which is provided to the other input of the combiner 433. The combiner 433 outputs the DFNE signal to the other input of the adder 411.

In operation, an 802.11b frame transmitted via the wireless medium is received and converted to baseband by the ZIF front end 201, which adds flicker noise and DC to the RBB received baseband analog signal. The ADC 209 samples the RBB signal at a rate of 22 MHz and the combiner 211 de-spins the signal by removing any frequency offset. Consequently, however, the combiner shifts the DC and flicker noise by the frequency offset. The CMF 213 includes programmed taps to estimate the multipath profile of the frame and attempt to undo the multipath distortion by applying inverse filtering. The signal is then gain adjusted to remove gain error and decimated by two to downsample to an 11 MHz rate signal, which is applied to the adder 409. The decimator 441 also decimates and downsamples the DS signal to the DDS signal to correspond with the downsampled signal path.

The first set of codewords to pass through the adder 411 are Barker codewords in the preamble portion of the frame, so that the switch 425 is initially set to select the Barker decision path. Each Barker codeword includes 11 chips, which are stored in the buffer 429 from the adder 411 while simultaneously being processed through the Barker path. The flicker noise feedback circuit 403 is initially zeroed prior to at least the very first codeword to be received, so that the DFNE signal is initially zero. In this manner, at least the first codeword of the first frame to pass through the adder 411 includes the DC and flicker noise distortions. The Barker codewords of the preamble are particularly robust, however, so that the Barker correlator 419, the Barker decision block 421 and the Barker lookup memory 423 are able to make relatively accurate determinations of the actual Barker codewords in the transmitted frame in spite of the DC and flicker noise distortions. The determined actual Barker codeword is output on the SC signal line and subtracted from the stored value in the buffer 429 by the adder 427, so that the ERR signal comprises a relatively accurate estimation of the DC and flicker noise distortion for the current codeword.

The DC and flicker noise distortion varies over time and with each codeword. The frequency bandwidth of the flicker noise is lower than the bandwidth of the codeword decision rate, so that only a portion of the ERR signal is retained for each cycle and accumulated in the accumulator 439. For example, the crossover frequency of the flicker noise relative to white or Gaussian noise is 400 kilohertz (KHz) or less, while the decision rate of the Barker path is approximately 1 MHz and the decision rate of the CCK path is approximately 1.375 MHz. The predetermined constant multiplier $K_{BW}$ applied by the amplifier 431 accounts for the bandwidth differential to provide the PERR signal, so that a relatively accurate estimation of the flicker noise accumulates over multiple codewords. The complex conjugate block 435 inverts the frequency offset applied by the combiner 211, which frequency shifted the DC and flicker noise relative to the de-spun signal. The combiner 437 de-spins the PERR signal comprising the residual DC and flicker noise, providing sample estimates of the distortion to the accumulator 439. The accumulated DC and flicker noise estimate is "re-spun" by the combiner 433 to develop the DFNE signal applied to the adder 411. The amplifier 431 and the accumulator 439 collectively implement filtering of the flicker noise estimate provided as the DFNE signal to the adder 411. The components 401, 441, 435, 245 and 433 collectively implements a phase circuit that de-spins flicker noise estimate samples provided to the accumulator 439 and re-spins the estimate to develop the DFNE signal.

The switch 423 selects the CCK lookup memory 417 in the CCK path when the Barker preamble is completed to continue processing the CCK payload portion of the frame, where each CCK codeword is processed at 8 chips per codeword. At this point, a relatively accurate estimation of the DC and flicker noise distortion is stored within the accumulator 439 for application to the CCK payload. This relatively accurate estimation of the DC and flicker noise distortion is subtracted by the adder 411 for the first CCK codeword to enable the CK correlator 413, the CCK decision block 415, and the CCK lookup memory 417 to make a relatively accurate determination of the first CCK codeword. The determined CCK codeword is subtracted from the value stored in the buffer 429 to make a relatively accurate determination of any residual DC and flicker noise distortion. Operation of the flicker noise feedback circuit 403 proceeds in this manner for the remaining CCK codewords of the packet payload. In one embodiment, the flicker noise feedback circuit 403 is zeroed after each frame (or packet), so that the process for each frame is substantially the same. Alternatively, the value stored in the accumulator 439, or a selected portion thereof, is retained from one frame for application to the next to speed up loop operation of the flicker noise feedback circuit 403 from frame to frame.

It is appreciated that the flicker noise feedback circuit 403 tracks the DC and flicker noise distortion, which is subtracted from the received signal as it is processed in the codeword processing paths of the receiver. Flicker noise with a frequency crossover of 400 or 500 KHz is normally difficult because it approaches the codeword rate of 1 or 1.375 MHz. It is otherwise difficult to make a good codeword decision until flicker noise is canceled, yet it is also difficult to accurately estimate the flicker noise until a codeword decision is made. Furthermore, since the flicker noise changes from one codeword to the next, the estimate from one codeword applied to the next will almost always have additional error. According to embodiments of the present invention, the relatively robust Barker preamble is employed to acquire and begin tracking a relatively accurate flicker noise for application to the somewhat less robust CCK payload. The flicker noise estimate is updated with each codeword, and subtracted from the next codeword. In this manner, the flicker noise behavior is updated such that flicker noise changes observed on the current codeword are used to update the flicker noise estimate subtracted from the next codeword. The inherent dilemma in which flicker noise changes from one codeword to the next still applies and tends to degrade the current codeword decision. Nonetheless, Additive White Gaussian Noise (AWGN) PER performance comparisons illustrate substantial improvement in codeword decision processing while employing decision directed flicker noise cancellation according to embodiment of the present invention.

Figure 5:
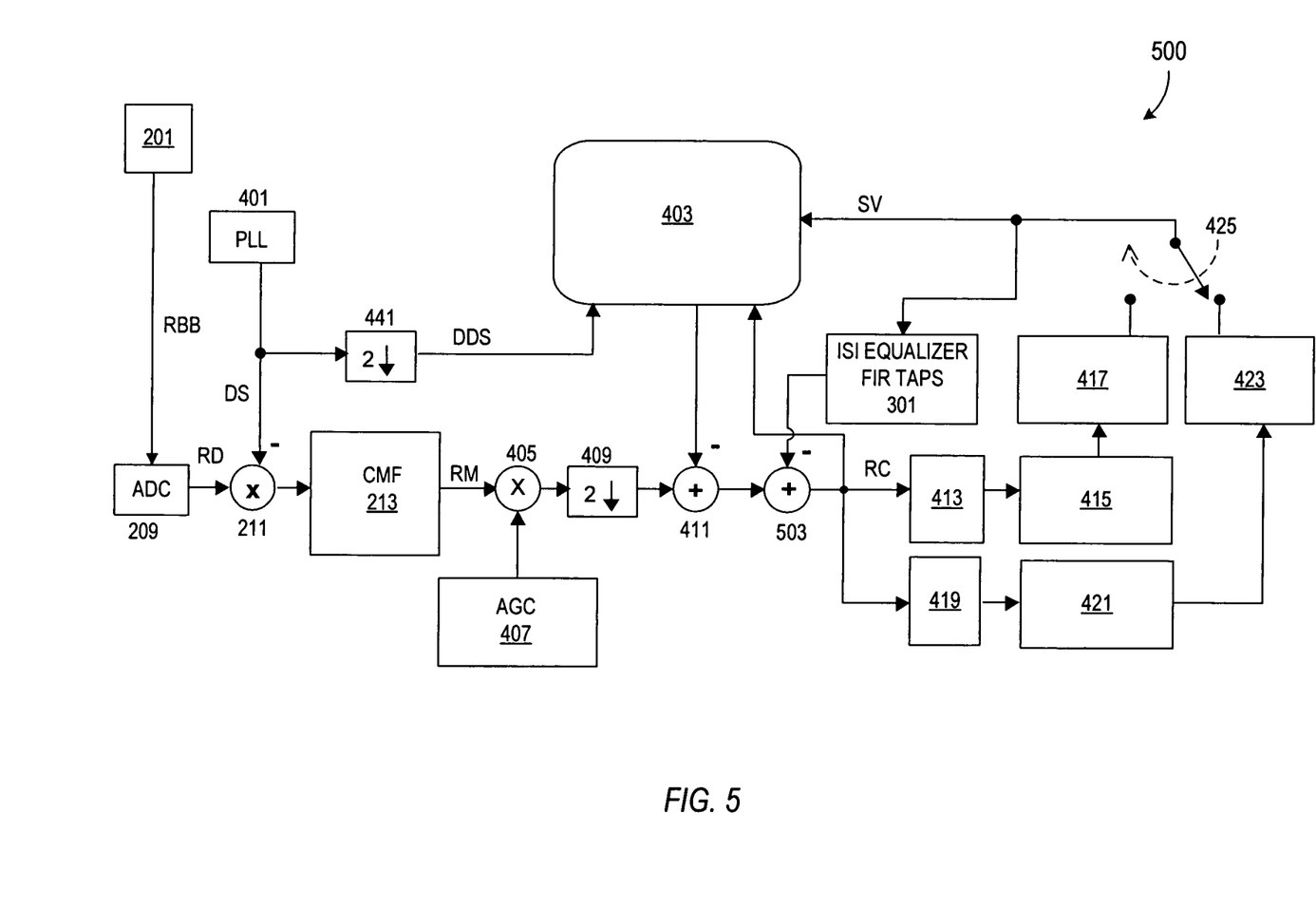
FIG. 5 is a simplified block diagram of a wireless receiver including feedback decision directed flicker noise cancellation according to another exemplary embodiment of the present invention illustrating the relationship to an CCK ISI equalizer.

FIG. 5 is a simplified block diagram of a wireless receiver 500 including feedback decision directed flicker noise cancellation according to another exemplary embodiment of the present invention illustrating the relationship to an CCK inter-codeword symbol interference (ISI) equalizer. The wireless receiver 500 is substantially similar to the wireless receiver 400 in which similar components assume identical reference numbers. The wireless receiver 500 includes CCK ISI equalizer FIR taps 501 which receive and filter the CCK codewords output from the CCK lookup memory 417 when selected by the switch 425 as the SV signal. The output of the adder 411 is provided to an input of another adder 503, which receives the filtered outputs of ISI equalizer FIR taps 501 at another input. The adder 503 subtracts the filtered outputs of ISI equalizer FIR taps 501 from the output of the adder 411 to generate the RC signal.

Figure 6:
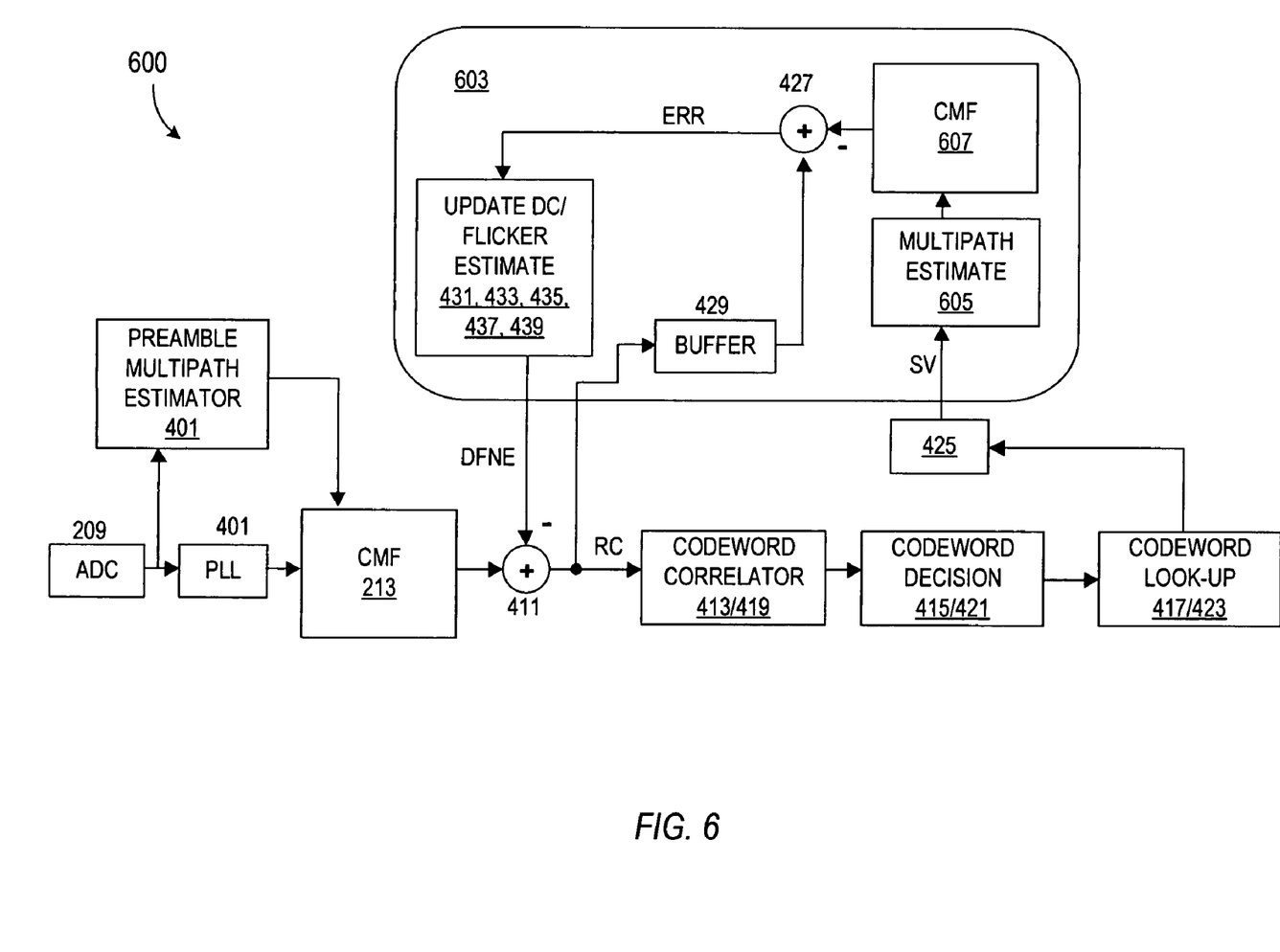
FIG. 6 is a simplified block diagram of a wireless receiver including feedback decision directed flicker noise cancellation according to another exemplary embodiment of the present invention illustrating compensation for multipath distortion.

FIG. 6 is a simplified block diagram of a wireless receiver 600 including feedback decision directed flicker noise cancellation according to another exemplary embodiment of the present invention. The wireless receiver 600 is substantially similar to the wireless receivers 400 and 500 in which similar components assume identical reference numbers. The wireless receiver 600 includes compensation for multipath distortion. In this case, a preamble multipath estimator 601 is shown that receives the output of the ADC 209, that estimates the multipath distortion and that programs the CMF 213 accordingly. The RC signal, comprising codeword chips, includes multipath distortion, such as inter-chip interference (ICI) and inter-codeword symbol interference (ISI). Each codeword with the multipath distortion is stored in the buffer 429. The flicker noise feedback circuit 403 is replaced with another flicker noise feedback circuit 603, which is similar but includes a multipath estimate block 605 and another CMF 607. The selected codewords on the SV signal line are provided to the multipath estimate block 605, which applies the multipath estimate to the pristine codewords to add multipath distortion as though the codewords had been transmitted in the wireless medium. The output of the multipath estimate block 605 is coupled to an input of the CMF 607 to simulate application of the CMF 213 in the received signal path. The multipath estimate block 605 and the CMF 607 comprise FIR taps that have already been calculated during the preamble of each frame for equalizer setup. In this manner, the CMF 607 outputs codewords with simulated multipath distortion with ICI and ISI. When subtracted from the corresponding codeword in the buffer 429 by the adder 427, the ERR signal includes reduced modulation noise, with ICI and ISI effectively removed. In this manner, the value stored and updated in the accumulator 439 is a more accurate estimate of DC and flicker noise.

Figure 7:
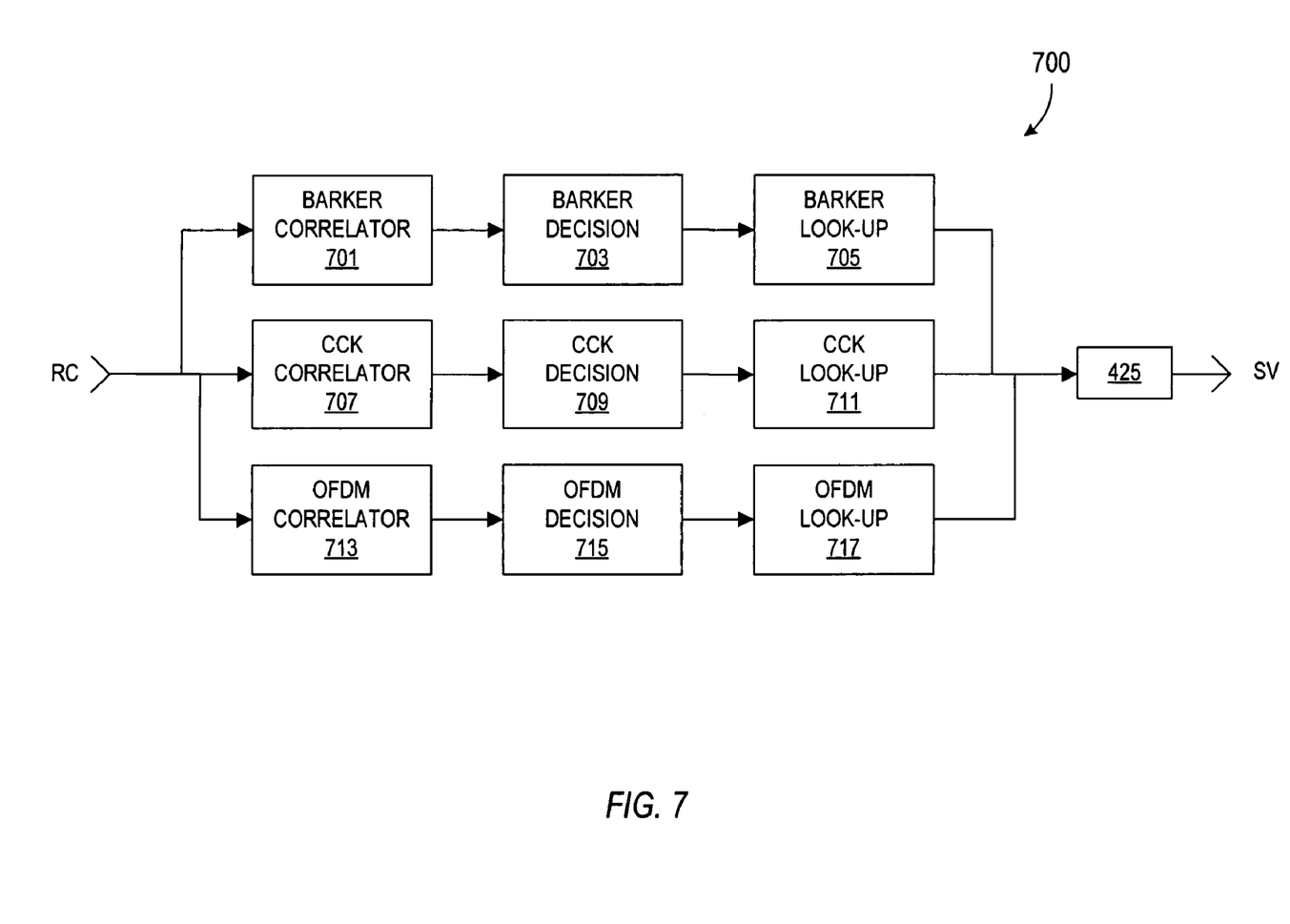
FIG. 7 is a block diagram of a portion of a wireless receiver including feedback decision directed flicker noise cancellation and multiple decision paths and a switch for selecting among the decision paths based on input signal type.

FIG. 7 is a block diagram of a portion of a wireless receiver including feedback decision directed flicker noise cancellation and multiple decision paths 700 and the switch 425 for selecting among the decision paths 700 based on input signal type. The decision paths 700 include a Barker decision path, a CCK decision path and an OFDM decision path each operative on the corrected received signal RC and providing the noise-free selected signal values SV selected by the switch 425 based on the type of input signal. The Barker decision path includes a Barker correlator 701, a Barker decision circuit 703 and a Barker look-up memory 705; the CCK decision path includes a CCK correlator 707, a CCK decision circuit 709 and a CCK look-up memory 711; and the OFDM decision path includes an OFDM correlator 713, an OFDM decision circuit 715 and an OFDM look-up memory 717. As previously described, the Barker decision path may be selected for the header or preamble portion of 802.11b type packets whereas the CCK decision path may be selected for the payload portion of the 802.11b packets. The OFDM decision path may be selected for 802.11a or 802.11g packets or any input signals employing OFDM signals.

The configurations of the receivers 400, 500 and 600 are referred to as "feedback" in that the input signal is modified to a corrected input signal at a preliminary point (e.g. adder 411) prior to the decision making process which is used to determine the flicker noise estimate at the feedback point. The feedback configuration is particularly advantageous for input signals with a robust preamble portion, such as Barker codewords or the like. As previously described, Barker codewords are particularly robust in spite of flicker noise so that relatively accurate determinations of the actual Barker codewords are made. This leads to relatively accurate determination of the flicker noise at the adder 427 and into the accumulator 439, so that the DFNE signal is relatively accurate to cancel flicker noise when the CCK signals are received. Even if inaccurate decisions are made, the filter operation of the amplifier 431 and the accumulator 439 tends to mitigate the effects of inaccurate determinations so that the DFNE signal becomes more accurate over time.

A decision directed flicker noise cancellation system and method according to embodiments of the present invention provides low complexity, robust joint flicker noise and DC cancellation. In the feedback configurations, the relatively robust Barker preamble is employed to initially estimate the flicker noise distortion so that the decisions of the packet payload are not fully corrupted by flicker noise. In effect, the DC and flicker noise is estimated and subtracted prior to codeword decisions. The signal path of the received signal is effectively unchanged. Rather than adding complex decision circuitry and delay paths, a single-pole feedback filter is added with simple codeword dependent DC scaling on the error signal is coupled in parallel with the existing codeword decision paths to calculate and cancel distortion. In this manner, there is no codeword decision latency and thus no SIFS impact. Frequency offset shifting of flicker noise is compensated by re-spinning, accumulating and de-spinning the estimate prior to subtracting the distortion from the signal path.

In some feedback embodiments, a portion of modulation noise, such as ICI and ISI, remains in the error signal since distortion-free codeword chips are subtracted from signal samples including modulation noise to generate the DC and flicker noise estimate. In alternative feedback embodiments, distortion is simulated and applied to the otherwise pristine codewords (after decision and lookup) prior to subtraction, which effectively removes modulation distortion. In this manner, multipath distortion is compensated for a more accurate determination of the DC and flicker noise estimate Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

The invention claimed is:

1. A decision directed flicker noise canceller for reducing flicker noise in a modulated, noise-corrupted input signal, comprising:
   a decision circuit that provides signal decisions based on the input signal;
   a conversion circuit that provides noise-free selected signal values based on said signal decisions;
   a first adder that subtracts said selected signal values from signals based on the input signal to provide a flicker noise estimate;
   a filter that receives and filters said flicker noise estimate and that provides a filtered flicker noise estimate; and
   a second adder that subtracts said filtered flicker noise estimate from the input signal and that provides a corrected input signal.

2. The decision directed flicker noise canceller of claim 1, further comprising:
   said second adder located in a feedback position prior to said decision circuit;
   said decision circuit comprising a demodulator that converts said corrected input signal from said second adder into said signal decisions;
   said conversion circuit comprising a memory that stores predetermined values that are selected based on said signal decisions; a buffer that stores corrected signal samples from said corrected input signal; and said first adder subtracting selected values from said memory from corresponding ones of said corrected signal samples from said buffer.

3. The decision directed flicker noise canceller of claim 2, wherein said demodulator comprises a correlator and a decision circuit.

4. The decision directed flicker noise canceller of claim 3, wherein said demodulator comprises a Barker correlator and a Barker decision circuit and wherein said memory comprises a Barker codeword look-up memory.

5. The decision directed flicker noise canceller of claim 3, wherein said demodulator comprises a CCK correlator and a CCK decision circuit and wherein said memory comprises a CCK codeword look-up memory.

6. The decision directed flicker noise canceller of claim 3, wherein said demodulator comprises an OFDM correlator and an OFDM decision circuit and wherein said memory comprises an OFDM symbol look-up memory.

7. The decision directed flicker noise canceller of claim 3, wherein said demodulator and conversion circuit comprises a plurality of decision paths, each including a correlator, a decision circuit and a look-up memory, and further comprising a switch that selects from among said plurality of decision paths based on input signal type to provide said selected signal values.

8. The decision directed flicker noise canceller of claim 2, wherein said filter comprises a multiplier that scales said flicker noise estimate and provides flicker noise estimate samples and an accumulator that accumulates said flicker noise estimate samples.

9. The decision directed flicker noise canceller of claim 8, further comprising a phase circuit that despins said flicker noise estimate samples from said multiplier and that respins accumulated flicker noise estimate samples from said accumulator.

10. The decision directed flicker noise canceller of claim 2, further comprising: an inter-codeword symbol interference (ISI) equalizer FIR filter that filters said selected values and that provides ISI filtered values; and a third adder that subtracts said ISI filtered values from said corrected signal samples and provides a filtered corrected input signal to said decision circuit.

11. The decision directed flicker noise canceller of claim 2, further comprising: a multipath estimate circuit that applies a multipath distortion estimate to said selected values to provide multipath distorted signal values; and a channel matched filter that filters said distorted signal values and that provides filtered distorted signal values to said first adder in lieu of said selected signal values.

12. The decision directed flicker noise canceller of claim 1, further comprising:
   said second adder located in a feed-forward position after said decision circuit;
   said decision circuit comprising a demodulator that demodulates the input signal and that outputs said signal decisions;
   said conversion circuit comprising a modulator that re-modulates said signal decisions to generate said noise-free selected signal values;
   a first delay device that delays the input signal to align timing with said noise-free selected signal values at said first adder; and
   a second delay device that delays the input signal to align timing with said filtered flicker noise estimate at said second adder.

13. The decision directed flicker noise canceller of claim 12, further comprising:

a decoder that decodes a demodulated signal from said demodulator to provide said signal decisions; and an encoder that encodes said signal decisions and provides encoded signals to said modulator.

14. The decision directed flicker noise canceller of claim 12, wherein said filter comprises a low pass filter.

15. A decision directed method of canceling flicker noise in a modulated input signal, comprising:

making signal decisions based on the input signal;

converting the signal decisions into noise-free selected signal values;

subtracting the selected signal values from a signal based in the input signal to provide a flicker noise estimate;

filtering the flicker noise estimate to provide a filtered flicker noise estimate; and subtracting the filtered flicker noise estimate from the input signal to provide a corrected input signal.

16. The method of claim 15, further comprising:

buffering corrected input signal samples from the corrected input signal;

said making signal decisions comprising demodulating the corrected input signal;

said converting comprising retrieving pre-stored values selected based on said demodulating; and said subtracting the selected signal values from a signal based on the input signal comprising subtracting retrieved values from corresponding ones of the buffered corrected input signal samples.

17. The method of claim 16, wherein said demodulating comprises correlating and deciding based on correlation results.

18. The method of claim 16, further comprising determining input signal type and selecting from a plurality of decision paths based on input signal type.

19. The method of claim 16, wherein said filtering the flicker noise estimate comprises scaling the flicker noise estimate and accumulating scaled values.

20. The method of claim 16, further comprising equalizing selected signal values and subtracting equalized signal values from the corrected input signal prior to said demodulating.

21. The method of claim 16, further comprising estimating multipath distortion, applying multipath estimate to the selected signal values to provide distorted values, and channel match filtering the distorted values prior to said subtracting the selected signal values from a signal based in the input signal.

22. The method of claim 15, further comprising:

said making signal decisions comprising demodulating the input signal and generating signal decisions;

said converting comprising re-modulating the signal decisions and generating noise-free selected signal values;

delaying the input signal to provide first delayed input signals that are time-aligned with the selected signal values;

said subtracting the selected signal values from a signal based in the input signal comprising subtracting the selected signal values from the first delayed input signals;

delaying the input signal to provide second delayed input signals that are time-aligned with the filtered flicker noise estimate; and said subtracting the filtered flicker noise estimate from the input signal comprising subtracting the filtered flicker noise estimate from the second delayed input signals.

23. The method of claim 22, further comprising:

decoding the demodulated input signal to provide decoded signals prior to said converting; and encoding the decoded signals prior to said converting.

* * * * *